(12) United States Patent
Baumgart et al.

(10) Patent No.: US 7,388,766 B2
(45) Date of Patent: Jun. 17, 2008

(54) HARMONIC CONTROL AND REGULATION SYSTEM FOR HARMONIC NEUTRALIZED FREQUENCY CHANGER

(75) Inventors: Gary E. Baumgart, Murrysville, PA (US); Kalyan K. Sen, Monroeville, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 0 days.

(21) Appl. No.: 10/928,657

(22) Filed: Aug. 26, 2004

(65) Prior Publication Data

US 2006/0044847 A1    Mar. 2, 2006

(51) Int. Cl.
*H02M 1/12* (2006.01)

(52) U.S. Cl. .................. 363/40; 363/71; 363/159; 323/207

(58) Field of Classification Search ............ 363/34–44, 363/71, 97, 98, 78, 80, 89, 159, 157, 160, 363/65, 163; 323/205–210; 327/552–559
See application file for complete search history.

(56) References Cited

U.S. PATENT DOCUMENTS

| | | | |
|---|---|---|---|
| 3,825,815 A | 7/1974 | Guugi et al. | |
| 4,651,265 A | 3/1987 | Stacey et al. | |
| 4,812,669 A | 3/1989 | Takeda et al. | |
| 5,005,115 A | 4/1991 | Schauder | |
| 5,047,909 A * | 9/1991 | Hosoda ................ | 363/40 |
| 5,077,517 A | 12/1991 | Tanoue et al. | |
| 5,172,009 A | 12/1992 | Mohan | |
| 5,198,746 A | 3/1993 | Gyugyi et al. | |
| 5,287,288 A | 2/1994 | Brennen et al. | |
| 5,309,353 A | 5/1994 | Schauder et al. | |
| 5,321,598 A | 6/1994 | Moran | |
| 5,327,335 A | 7/1994 | Maddali et al. | |
| 5,329,217 A | 7/1994 | Kerkman et al. | |
| 5,377,092 A | 12/1994 | Rowand, Jr. et al. | |
| 5,384,696 A * | 1/1995 | Moran et al. .............. | 363/40 |
| 5,465,203 A | 11/1995 | Bhattacharya et al. | |
| 5,498,994 A | 3/1996 | Furuta | |
| 5,499,178 A | 3/1996 | Mohan | |
| 5,567,994 A | 10/1996 | Davis et al. | |

(Continued)

OTHER PUBLICATIONS

Sen, Kalyan K, STATCOM—Static Synchronous Compensator: Theory Modeling, and Applications, IEEE Power Engineering Societies, 1999 Winter Conference Proceedings, 1999, no date.

(Continued)

*Primary Examiner*—Rajnikant B. Patel
(74) *Attorney, Agent, or Firm*—Reed Smith LLP (57) ABSTRACT

A control and regulation system for use with a harmonic neutralization frequency changer system. In the generalized frequency changer system, a direct converter frequency changer is used to convert bulk power, but unwanted harmonics are introduced. Input and output power distortion is monitored by a control system, and groups of high performance inverters inject shunt/series harmonic currents/voltages into a specially designed transformer to neutralize the power distortion to a specific acceptable level. Two control strategies are used including one that is based on discrete narrow band harmonic regulation and another that is based on wide band harmonic control. Each of these control strategies can be used at the input and/or output of the frequency changer and can be injected using shunt-current and series-voltage schemes.

20 Claims, 6 Drawing Sheets

U.S. PATENT DOCUMENTS

| | | |
|---|---|---|
| 5,585,708 A | 12/1996 | Richardson et al. |
| 5,751,138 A | 5/1998 | Venkata et al. |
| 5,808,452 A | 9/1998 | Gyugyi et al. |
| 5,883,796 A | 3/1999 | Cheng et al. |
| 5,914,866 A | 6/1999 | Eguchi et al. |
| 5,936,855 A | 8/1999 | Salmon |
| 6,075,350 A | 6/2000 | Peng |
| 6,154,379 A | 11/2000 | Okita |
| 6,297,980 B1 | 10/2001 | Smedley et al. |
| 6,307,759 B1 | 10/2001 | Inarida et al. |
| 6,326,796 B1 | 12/2001 | Koda et al. |
| 6,472,775 B1 | 10/2002 | Huang et al. |
| 6,604,056 B2 | 8/2003 | Ulrich |
| 6,697,270 B1 | 2/2004 | Kalman et al. |

OTHER PUBLICATIONS

Guygui, L., Schaude, C. D. and Sen, K. K., "Static Synchronous Series Compensator: A Solid-State Approach to the Series Compensation of Transmission Lines," IEEE Trans. Power Delivery, vol. 12, No. 1, pp. 408-413, Jan. 1997.

Sen, K. K., "SSSC—Static Synchronous Series Compensator: Theory, Modeling, and Applications," IEEE Trans. Power Delivery, vol. 13, No. 1, pp. 241-246, Jan. 1998.

* cited by examiner

HARMONIC CONTROL AND REGULATION SYSTEM FOR HARMONIC NEUTRALIZED FREQUENCY CHANGER

BACKGROUND OF THE INVENTION

1. Field of the Invention

The present invention relates generally to frequency changer circuits for electric motor systems, and more specifically, the present invention relates to the calculation, generation, application and control of currents to neutralize unwanted harmonic frequencies in conventional frequency changer circuits.

2. Description of the Background

In many diverse environments, electric motors are used as drive or propulsion systems. The requirement for low noise and low distortion power conversion systems has made the multilevel PWM (pulse width modulation) technology a strong contender for many different electric motor drive applications. However, the efficiency and power density of this technology is limited by the need for two to three stages of power conversion. Specifically, power must first be converted from AC to DC and then from DC back to AC by accommodating the PWM technology.

These multistage conversions hinder system efficiency and lower power density. For example, the losses in the conversion processes typically range from 2-3% of applied power. Moreover, the power density for the PWM multilevel inverter has traditionally remained in the range of from 0.5 to just over 1.0 $MW/m^3$. In fact, when all of the equipment required for the total conversion process, (e.g., transformers, rectifiers, inverters and filters) are included in the power density calculation, the system power density is typically in the range of 0.5-0.75 $MW/m^3$.

In many applications, these losses are not acceptable. For example, any wasted power in "onboard" or self-sustained systems such as ships and submarines significantly decreases propulsion system performance. Where power is at a minimum, the present invention finds its most effective applications.

In addition to these specific propulsion applications, improvements in the power density via a reduction in losses is continually sought in all electric motor arts. As such, the present invention preferably provides a system architecture capable of improving the power density of electric motors over traditional PWM systems by a factor of at least 3-6 times and reducing system losses to about 1%.

SUMMARY OF THE INVENTION

The harmonic neutralization frequency changer system utilizes a direct converter frequency changer to convert bulk power. However, the direct converter frequency changer also produces unwanted harmonics that are preferably removed from the system. Input and output power distortion is monitored by a control system, and groups of high performance inverters inject shunt/series harmonic currents/voltages into a specially designed transformer to neutralize the power distortion to a specific acceptable level.

In at least one preferred embodiment, the present invention provides improved circuit topologies and control methodologies for a direct conversion frequency changer current controller and for PWM inverter controllers for harmonic neutralization. There are two basic control strategies that can be applied to this invention: (1) wide band; and (2) narrow band. The wide band harmonic neutralization scheme is based on discrimination of the fundamental frequency, and the narrow band or discrete harmonic neutralization scheme is based on a pre-calculated harmonic spectrum for the chosen power converter. Each of these control strategies can be applied to both the input and output inverters. Each of these control strategies can be injected into the harmonic neutralization frequency changer system via a current-shunt or voltage series injection methodology.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

The requirement for low noise distortion power conversion has made the multilevel PWM technology a strong contender for electric motor drive applications. However, the efficiency and power density of this technology is limited by the need for two to three stages of power conversion. Power must first be converted from ac to dc and then dc to ac. As a result the losses in these conversion processes range from 2-3%. The power density for the PWM multilevel inverter has up to now remained in the range of 0.5 to just over 1.0 $MW/m^3$. When all equipment required for the total conversion process, (transformers, rectifiers, inverters and filters) are included in the power density calculation, the system power density will be in the range of 0.5-0.75 $MW/m^3$.

Figure 1:
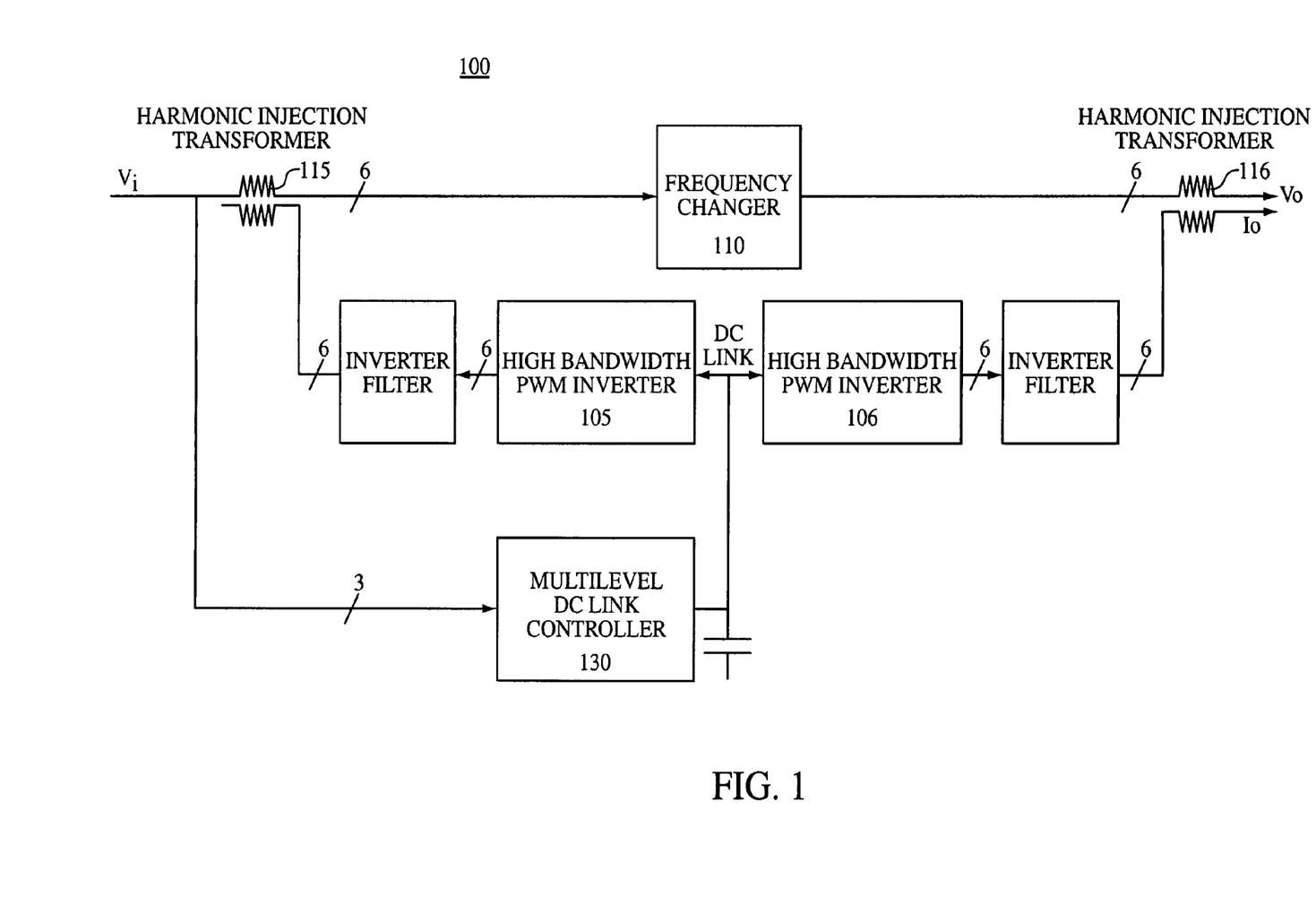
FIG. 1 is a block diagram of a harmonic neutralized frequency changer.

The invention will reduce system losses by a factor of 2 to 3 and will increase the power density by a factor of 3 to 6 times better than basic multilevel PWM power converters. We call this technology a Harmonic Neutralized Frequency Changer. FIG. 1 depicts a general block diagram of the system architecture according to the overall concept of the present invention, with a special emphasis on aspects of the frequency changer current controller and the input and output inverter controllers (current and voltage) for use therein.

The power converter design (100) of FIG. 1 is based on a unique topology that employs a direct conversion frequency changer to convert the source AC power to variable frequency output power. In a practical application, the source AC power can be a generator and the output power can be applied to a motor load, but this is only an exemplary component selection for purposes of describing the present invention.

These types of power converters are very efficient and have high power densities compared to DC link power converters. However, direct power converters generate a broad spectrum of unwanted harmonics in the input and output current. These generated harmonics are a function of the generator frequency and the variable output frequency. The power converter topology 100 of the present invention shown in FIG. 1 neutralizes the dominant harmonic currents in both the input and output by injecting neutralizing harmonic currents generated by high bandwidth inverters 105, 106 while only demanding modest power capability. By use of the present invention, the total harmonic current distortion is preferably less than 0.1% of rated current, and the worst-case single harmonic current is preferably less than 0.05% of the rated current.

As seen in FIG. 1, the traditional path from an input voltage (Vi) to the output voltage (Vo) is accomplished through a conventional frequency changer 110. The present invention, however, adds harmonic injection transformers at both the input 115 and output 116 of the frequency changer. These harmonic injection transformers 115, 116 are used to inject signals that neutralize the unwanted harmonics that exist at the input and output of the frequency changer 110. The neutralizing harmonics are generated by high bandwidth PWM inverters 105, 106 controlled by a multilevel DC link controller 130 as described below. More detail on the general operation of this circuit can be found in co-owned U.S. patent application Ser. No. 10/694,650 filed on Oct. 27, 2003 which is incorporated by this reference in its entirety.

In sum, the present invention is directed to certain aspects of this harmonic neutralized frequency changer described above (FIG. 1). Specifically, the present invention is directed to an improved frequency changer controller, and several different narrow band and wide band versions of input and out inverter controllers. The frequency changer controller will be discussed first, followed by a discussion of several embodiments of input and output inverter controllers.

Frequency Changer Controller

Figure 2:
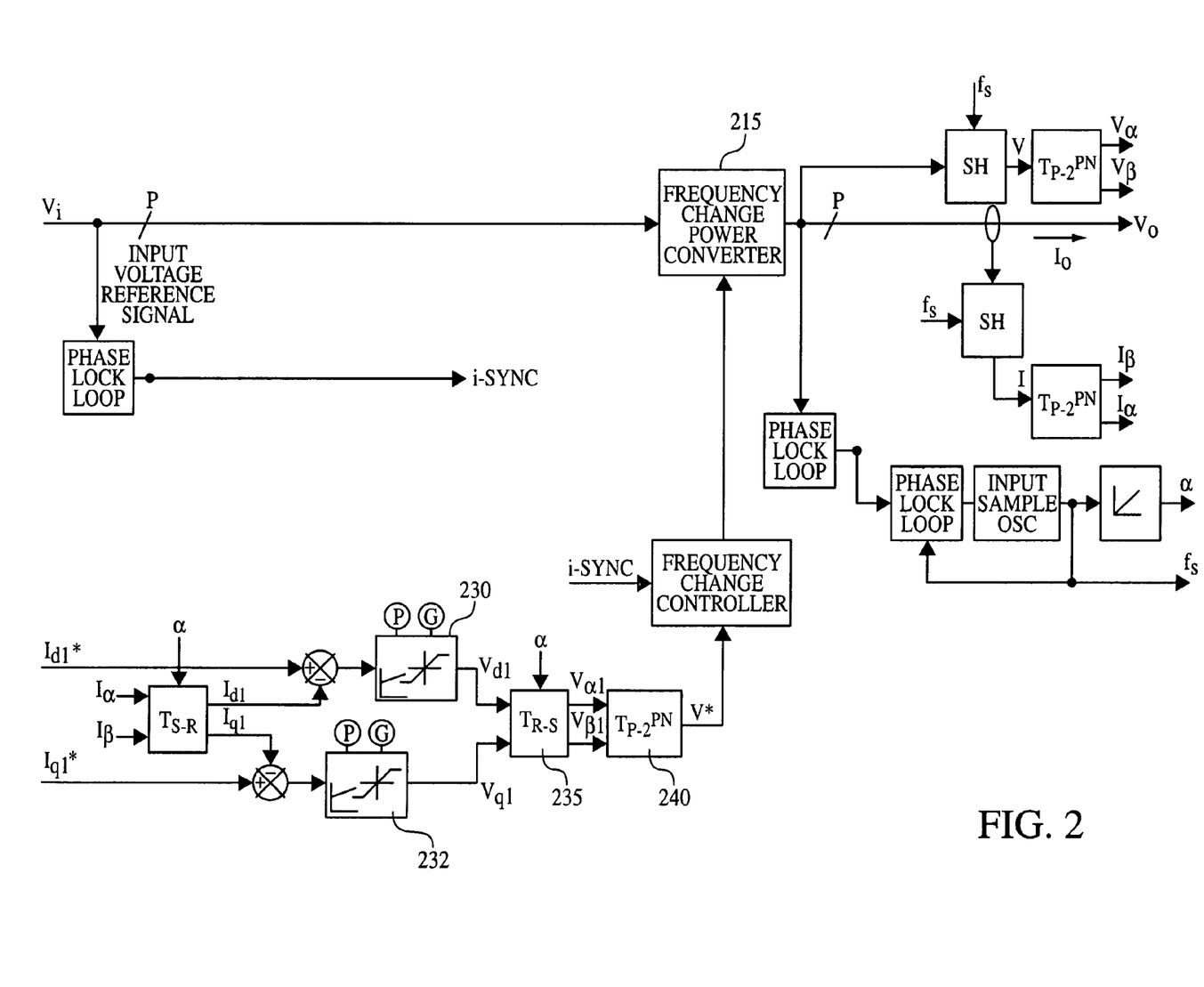
FIG. 2 is a block diagram of a direct conversion frequency changer current controller.

FIG. 2 is a block diagram of one exemplary frequency changer current controller according to the present invention. The frequency changer gate controller is synchronized to the source voltage by a phase-lock loop. The preferred implementation of the control system is a numerical (digital) control with the sample frequency synchronized to the frequency changer output fundamental frequency.

The frequency changer power converter 215 is regulated to control the fundamental current and the bulk power transfer of the power converter system (FIG. 1) to a motor load. Control loops for output flux, torque and speed are used to generate rotating reference signals for direct and quadrature current shown in FIG. 2. These control loops are structured to be applied to electric motors but can be applied to power conditioning systems with only simple modifications. The load control regulation uses rotating reference signals synchronous with the frequency changer output fundamental frequency. Therefore, the natural multiphase stationary reference signals must be converted to rotating reference signals.

As seen in the upper right hand corner of FIG. 2, the controller samples (at sampling rate $f_s$) the frequency converter 215 output current ($I_\alpha$, $I_\beta$) and voltage ($V_\alpha$, $V_\beta$). These signals ($I_\alpha$, $I_\beta$, $V_\alpha$, $V_\beta$) are applied to a series of reference transformations to demodulate the converter fundamental current to a dc level in a rotating coordinate system synchronous with the frequency changer output fundamental frequency.

The transformation for converting multi-phase stationary reference signals to two-phase signals is designated by $T^{P2PN}$ where the subscript p represents the number of phases and can be any number greater than two. In this example, it is assumed that p is 12 representing a 12-phase system consisting of 4 groups of 3 phases within each group displaced by the angles $\theta_j$, $\theta_k$ and $\theta_l$. $T_{12-2}^{PN}$ is given by equation 1:

$$\begin{bmatrix} Y_\alpha \\ Y_\beta \end{bmatrix} = \frac{2}{3}\begin{bmatrix} \sin(0) & \sin(240) & \sin(120) \\ \cos(0) & \cos(240) & \cos(120) \end{bmatrix} \cdot \begin{bmatrix} X(1) \\ X(2) \\ X(3) \end{bmatrix} + \quad \text{equation 1}$$

$$\frac{2}{3}\begin{bmatrix} \sin(0+\theta_j) & \sin(240+\theta_j) & \sin(120+\theta_j) \\ \cos(0+\theta_j) & \cos(240+\theta_j) & \cos(120+\theta_j) \end{bmatrix} \cdot \begin{bmatrix} X(4) \\ X(5) \\ X(6) \end{bmatrix} +$$

$$\frac{2}{3}\begin{bmatrix} \sin(0+\theta_k) & \sin(240+\theta_k) & \sin(120+\theta_k) \\ \cos(0+\theta_k) & \cos(240+\theta_k) & \cos(120+\theta_k) \end{bmatrix} \cdot \begin{bmatrix} X(7) \\ X(8) \\ X(9) \end{bmatrix} +$$

$$\frac{2}{3}\begin{bmatrix} \sin(0+\theta_l) & \sin(240+\theta_l) & \sin(120+\theta_l) \\ \cos(0+\theta_l) & \cos(240+\theta_l) & \cos(120+\theta_l) \end{bmatrix} \cdot \begin{bmatrix} X(10) \\ X(11) \\ X(12) \end{bmatrix}$$

where, $\theta_j$, $\theta_k$ and $\theta_l$ are phase displacement angles for three-phase groups in a multiple phase power system.

The stationary reference system has an orthogonal $\alpha$-$\beta$ axis and the rotating reference has an orthogonal direct and quadrature axis (d-q axis) that rotate synchronously with the fundamental in the $\alpha$-$\beta$ system.

The stationary reference signal two-phase signal is subsequently transformed to a two-phase rotating reference signal without any loss of system state information. The transformation for converting two-phase stationary reference signals to two-phase rotating reference signals, $T^{SR}$, is given by equation 2:

$$\begin{bmatrix} Zdn \\ Zqn \end{bmatrix} = \begin{bmatrix} \cos(n \cdot \alpha) & \sin(n \cdot \alpha) \\ -\sin(n \cdot \alpha) & \cos(n \cdot \alpha) \end{bmatrix} \cdot \begin{bmatrix} Y\alpha n \\ Y\beta n \end{bmatrix} \quad \text{equation 2}$$

Where n is a signed integer equal to the order of the harmonic. n=1 for the fundamental. n is positive for positive sequence harmonics and negative for negative sequence harmonics.

This control methodology facilitates independent d-q current ($I_{d1}$, $I_{q1}$) control of the fundamental current only. The fundamental current reference signals Id1*, and Iq1* are generated by the flux and torque controllers mentioned above.

A pair of proportional plus integral (PI) controllers 230, 232 that independently regulate the direct 230 and quadrature 232 current controls the current by generating voltage signals ($V_{d1}$, $V_{q1}$) for the frequency changer. The voltage signals ($V_{d1}$, $V_{q1}$) are two-phase rotating reference signals that must be transformed back to the multiphase stationary reference format.

This transformation (235) for converting two-phase rotating reference signals to two-phase stationary reference signals, $T^{RS}$, is given by equation 3:

$$\begin{bmatrix} Y\alpha n^* \\ Y\beta n^* \end{bmatrix} = \begin{bmatrix} \cos(n \cdot \alpha) & -\sin(n \cdot \alpha) \\ \sin(n \cdot \alpha) & \cos(n \cdot \alpha) \end{bmatrix} \cdot \begin{bmatrix} Zdn^* \\ Zqn^* \end{bmatrix} \quad \text{equation 3}$$

The transformation (240) for converting two-phase stationary reference signals to multi-phase signals (in this case, 12-phase signals), $T_{12-p}^{PN}$ is given by equation 4:

$$\begin{bmatrix} X(1)^* \\ X(2)^* \\ X(3)^* \\ X(4)^* \\ X(5)^* \\ X(6)^* \\ X(7)^* \\ X(8)^* \\ X(9)^* \\ X(10)^* \\ X(11)^* \\ X(12)^* \end{bmatrix} = \sqrt{2} \cdot \begin{bmatrix} \sin(0) & \cos(0) \\ \sin(240) & \cos(240) \\ \sin(120) & \cos(120) \\ \sin(0+\theta_j) & \cos(0+\theta_j) \\ \sin(240+\theta_j) & \cos(240+\theta_j) \\ \sin(120+\theta_j) & \cos(120+\theta_j) \\ \sin(0+\theta_k) & \cos(0+\theta_k) \\ \sin(240+\theta_k) & \cos(240+\theta_k) \\ \sin(120+\theta_k) & \cos(120+\theta_k) \\ \sin(0+\theta_l) & \cos(0+\theta_l) \\ \sin(240+\theta_l) & \cos(240+\theta_l) \\ \sin(120+\theta_l) & \cos(120+\theta_l) \end{bmatrix} \cdot \begin{bmatrix} Y\alpha^* \\ Y\beta^* \end{bmatrix} \quad \text{equation 4}$$

The resulting voltage reference signal (V*) is then sent through the frequency change controller 250 (synched with i-SYNC form the phase-lock loop) to the frequency change power converter 215.

The above description of the direct conversion frequency changer current controller provides the basic control for the system. However, these signals contain the desired fundamental signal as well as unwanted harmonics. The harmonics can be removed from the input and/or output power by injecting a signal (at 115 and 116 in FIG. 1) equal to the inverse of the harmonic components. This is accomplished by using a high bandwidth power converter to generate the inverse harmonic currents. To provide the high bandwidth a PWM multilevel IGBT inverter will be used.

Inverter Controller

Where the frequency changer controls the bulk power of the system, the input and output inverters control the harmonic currents that are injected into the input and output of the bulk power converter to neutralize or cancel the harmonically corrupted bulk power. The inverters need to be sized to provide reactive power that allows the inverters to be rated as a fraction of the system rating.

The design for the inverter controller (which is generalized herein as either an input or output controller) is critical to the overall operation of the system and to the elimination of harmonics from the power signal. In other words, although the exemplary embodiments described herein are injected at the output of the bulk power converter, the same circuit can be used to inject harmonic-canceling signals at the input.

There are two basic control strategies that can be applied to this invention: (1) wide band; and (2) narrow band. Briefly stated the wide band harmonic neutralization scheme is based on discrimination of the fundamental frequency, and the narrow band or discrete harmonic neutralization scheme is based on a pre-calculated harmonic spectrum for the chosen power converter. Each of these control strategies can be applied to both the input and output inverters. The narrow band strategy (as an output-side inverter) will be discussed in detail below, followed by an overview and comparison of the wide band schemes.

Figure 3:
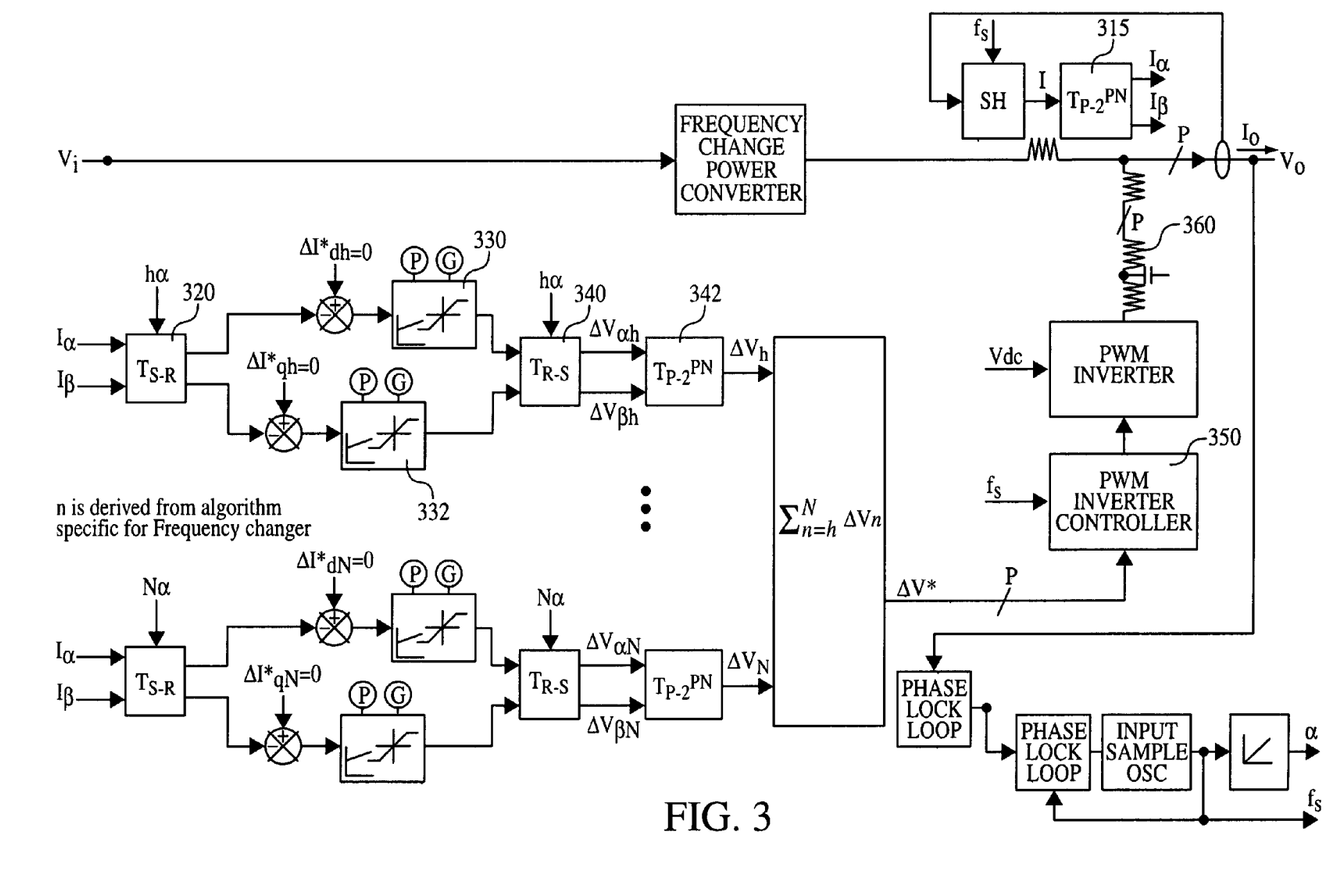
FIG. 3 is a block diagram of a PWM inverter current controller for narrow band harmonic neutralization using shunt current injection.

In the first preferred embodiment of the present current controller, the harmonic injection can be implemented as a shunt current into the output (or input) to cancel the resident harmonic currents. FIG. 3 shows a block diagram of a PWM (pulse width modulated) inverter current controller for narrow band harmonic neutralization using shunt current injection according to the present invention.

As with the frequency changer current controller (FIG. 2), the inverter controller is synchronized to the frequency changer output fundamental frequency by a phase-lock-loop 305 resulting in a signal representing the fundamental frequency angle $\alpha$ and the sample frequency pulse $f_s$. Signal sampling (upper right hand corner of FIG. 3) and processing are also synchronized to the frequency changer output fundamental frequency. For this narrow band, current injection configuration, the frequency changer current (I) must be the observed control signal. Therefore, the frequency changer current is sampled in the natural multiphase stationary reference system. These signals are applied to a series of reference coordinate systems (the multiple control paths in the lower left hand corner of FIG. 3) synchronous with the frequency changer output fundamental frequency.

The transformation for converting 12-phase stationary reference signals (I) to two-phase ($I_\alpha$, $I_\beta$) uses the $T_{12-2}^{PN}$ transformation 315 described above. The stationary reference signal two-phase signal ($I_\alpha$, $I_\beta$) is subsequently transformed to two-phase rotating reference current signals without any loss of system state information. Using the same $T_{S-R}$ transformation 320 defined above. However, the transformation is rotated at the frequency of a specified harmonic signal. The result of this transformation is a signal equal to the specified harmonic as observed in the rotating reference.

The harmonic rotating reference current signals are applied to a pair of proportional plus integral (PI) controllers 330, 332 that independently regulate the direct (330) and quadrature (332) inverter current components by generating voltage references for the inverter. The voltage references are two-phase rotating reference signals that must be transformed back to the multi-phase stationary reference format using the $T_{R-S}$ and $T_{p-2}^{PN}$ transformations (340, 342, respectively) described above.

As described above, these calculations are carried out n times, where n is derived from an algorithm specific for the selected frequency changer and represents the number of harmonics to be cancelled. The individual harmonic signals ($\Delta V_h$ through $\Delta V_N$) for each phase in the stationary reference are subsequently summed (345) to generate a voltage reference signal ($\Delta V^*$) for each phase.

The multi-phase, stationary reference signals $\Delta V^*$ are sent to the PWM inverter controller 350 that generates the appropriate level of harmonic voltage or harmonic current for injection into the load circuit. In this process the inverter in association with a reactor becomes a harmonic current source. At the point of injection, the harmonic signals are inverted and cancel the resident harmonic components. In the FIG. 3 embodiment, the current signals are injected using shunt current injection 360.

As briefly described above, this process is applied to a specified number of the dominant harmonics produced by the frequency changer. FIG. 3 represents this by showing an "n" number of control paths that generate the canceling harmonic signals (lower left hand corner of FIG. 3). The value of n for the specified harmonics can be calculated for any specified type of frequency changer for a specified operating condition. If the most dominant 6 to 12 harmonics are neutralized by this process, the output distortion of the frequency changer can be reduced by a factor of 5 to 10.

Voltage Controller with Series Injection

Figure 4:
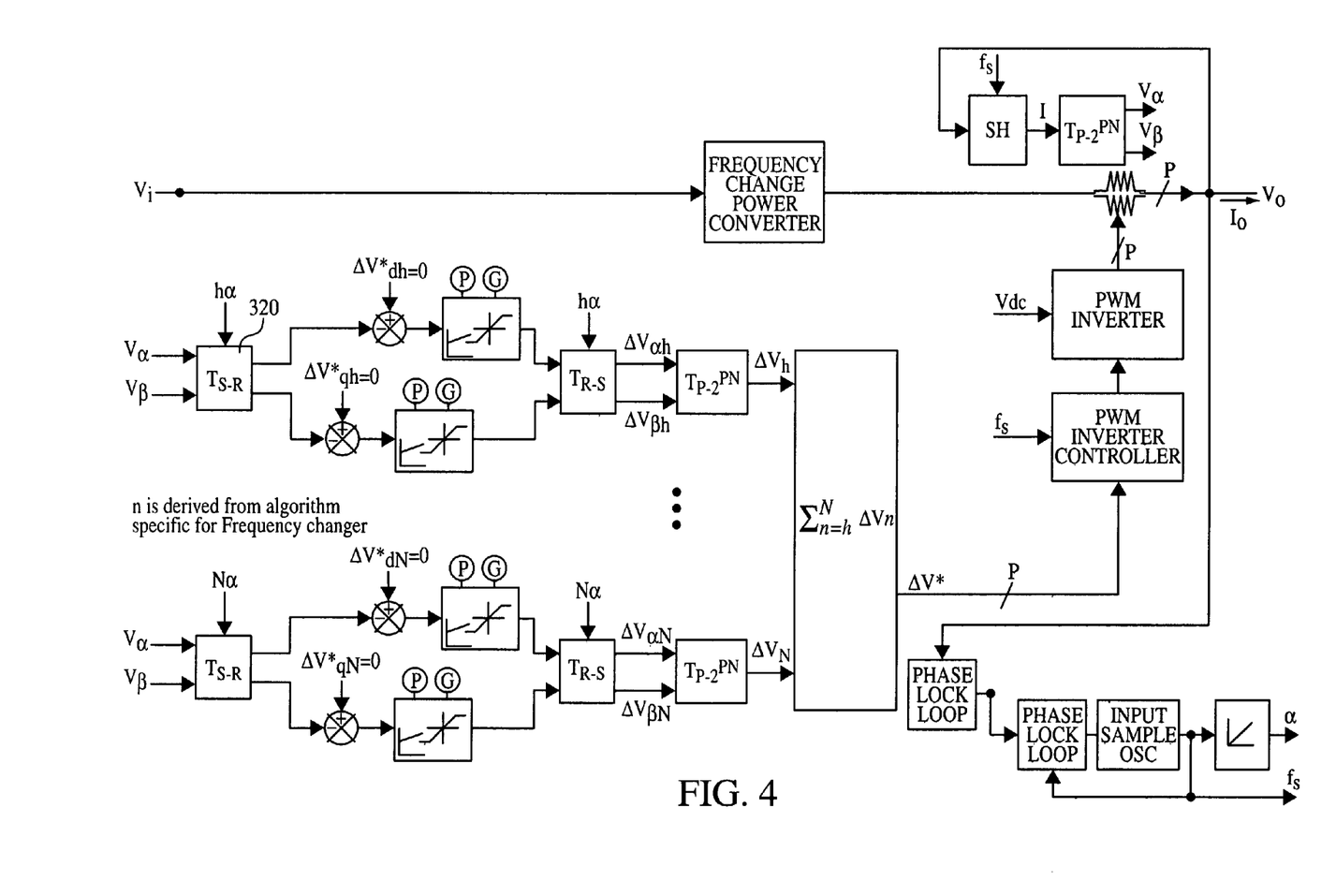
FIG. 4 is a block diagram of a PWM inverter voltage controller for narrow band harmonic neutralization using series voltage injection.

Although similar in operation, in addition to the PWM inverter current controller for narrow band neutralization using shunt current injection (FIG. 3), there is also a series voltage injection version of the narrow band neutralization inverter controller (see FIG. 4). In most respects, the narrow band series voltage version of the controller operates in the same manner as the narrow band shunt current implementation, and the subtle differences are outlined below.

FIG. 4 is a block diagram of a PWM inverter voltage controller for narrow band harmonic neutralization using series voltage injection. Note that in FIG. 4, just like with the shunt current case, a phase-lock loop circuit is used to obtain the fundamental frequency angle $\alpha$ and the sample fundamental frequency $f_s$. However, this sample fundamental frequency is used to obtain voltages $V_\alpha$ and $V_\beta$ (rather than currents $I_\alpha$ and $I_\beta$) to be used in the controller to cancel the narrow band harmonics. There are then n (a number which is derived from an algorithm specific to the bulk frequency changer utilized in the system) sub-circuits used to generate cancellation harmonic voltage signals to cancel n harmonics in the system. Throughout these calculations (which track those as described above with respect to FIG. 3), voltages are used in place of currents, but the operation is the same in all material respects.

After summing the harmonic cancellation signals, these signals are fed through a PWM inverter controller 450 and a PWM inverter 460. The injection network for the present embodiment uses series voltage injection 470 in place of the shunt current injection as described above with respect to FIG. 3. Other than these voltage-for-current replacements, there are no material differences between the inverter controllers for narrow band harmonic neutralization.

Wide Band Harmonic Neutralization (Series and Shunt)

Figure 5:
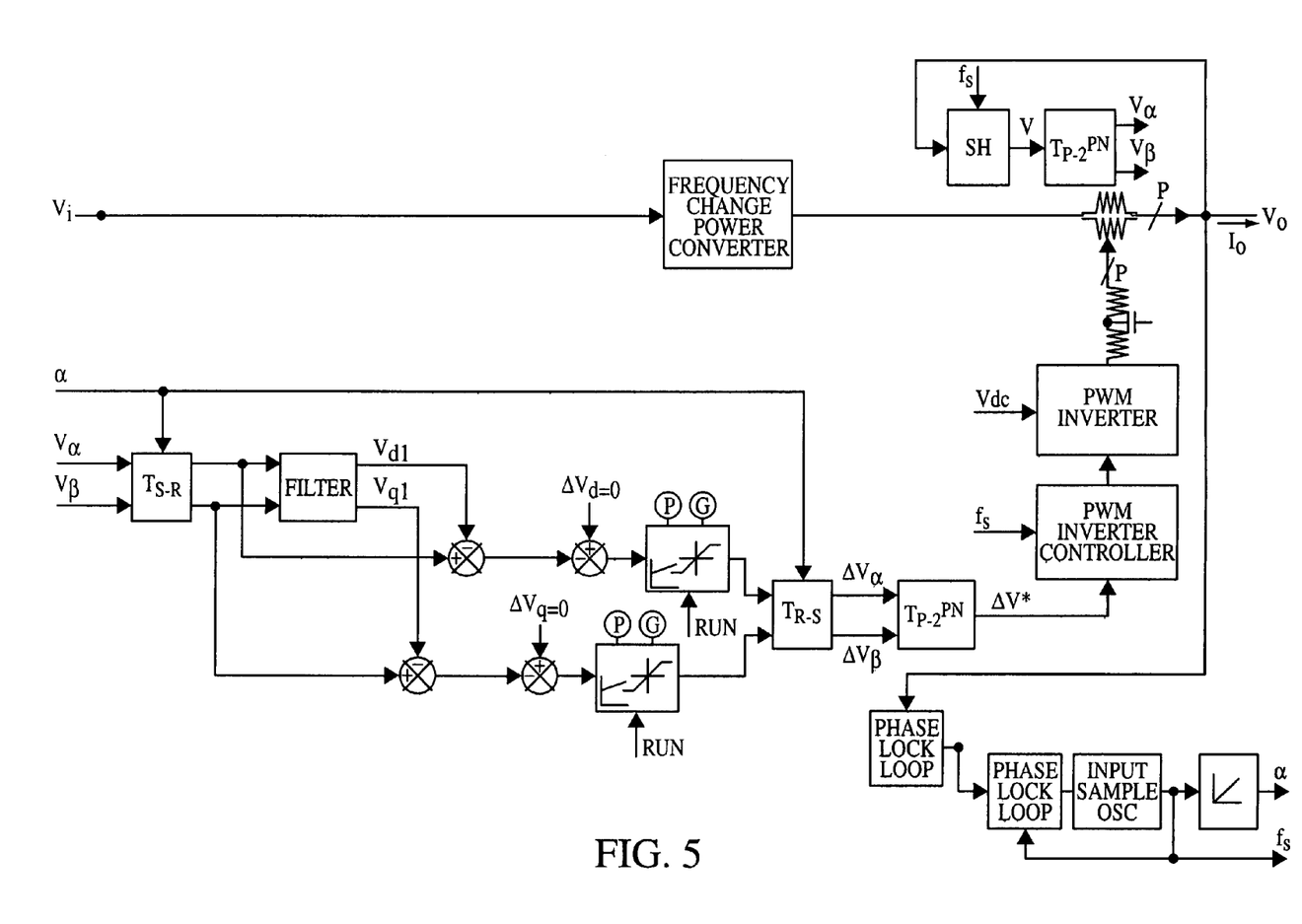
FIG. 5 is a block diagram of a PWM inverter voltage controller for wide band harmonic neutralization using series voltage injection.

As described above, whereas the narrow band harmonic neutralization is based on a pre-calculated harmonic spectrum for the power converter, the wide band version of the inverter controller neutralizes harmonics based on fundamental discrimination. FIG. 5 shows a block diagram of an exemplary PWM inverter voltage controller for wide band harmonic neutralization using series voltage injection. The differences between the narrow band and wide band versions of the present invention are described below.

Specifically, the phase-lock loop for generating the fundamental frequency angle $\alpha$ and the sample frequency pulse $f_s$ operate as described above. Likewise, the voltage V is sampled and converted from a multi-phase stationary reference signals to two-phase signals using the $T_{p-2}^{PN}$ transformation described above, resulting in $V_\alpha$, $V_\beta$.

The stationary reference signal two-phase signal is subsequently transformed to two-phase rotating reference signals without any loss of system state information using the $T_{s-r}$ transformation described above. This signal contains the fundamental and all harmonics.

At this stage, however, rather than calculating canceling signals for a specified number of unwanted harmonics, the wide band version (FIGS. 5-6) of the inverter controller run the two-phase rotating reference signals through a filter 570 which removes the higher harmonics of the direct and quadrature feedback signals.

This filtering 570 (which occurs through two separate filters) provides a set of signals ($V_{d1}$, $V_{q1}$) that only contain the fundamental component. This signal is subsequently subtracted from the original set of d-q signals, and the result is a set of d-q signals that contain only the harmonic components of the original signal.

Figure 6:
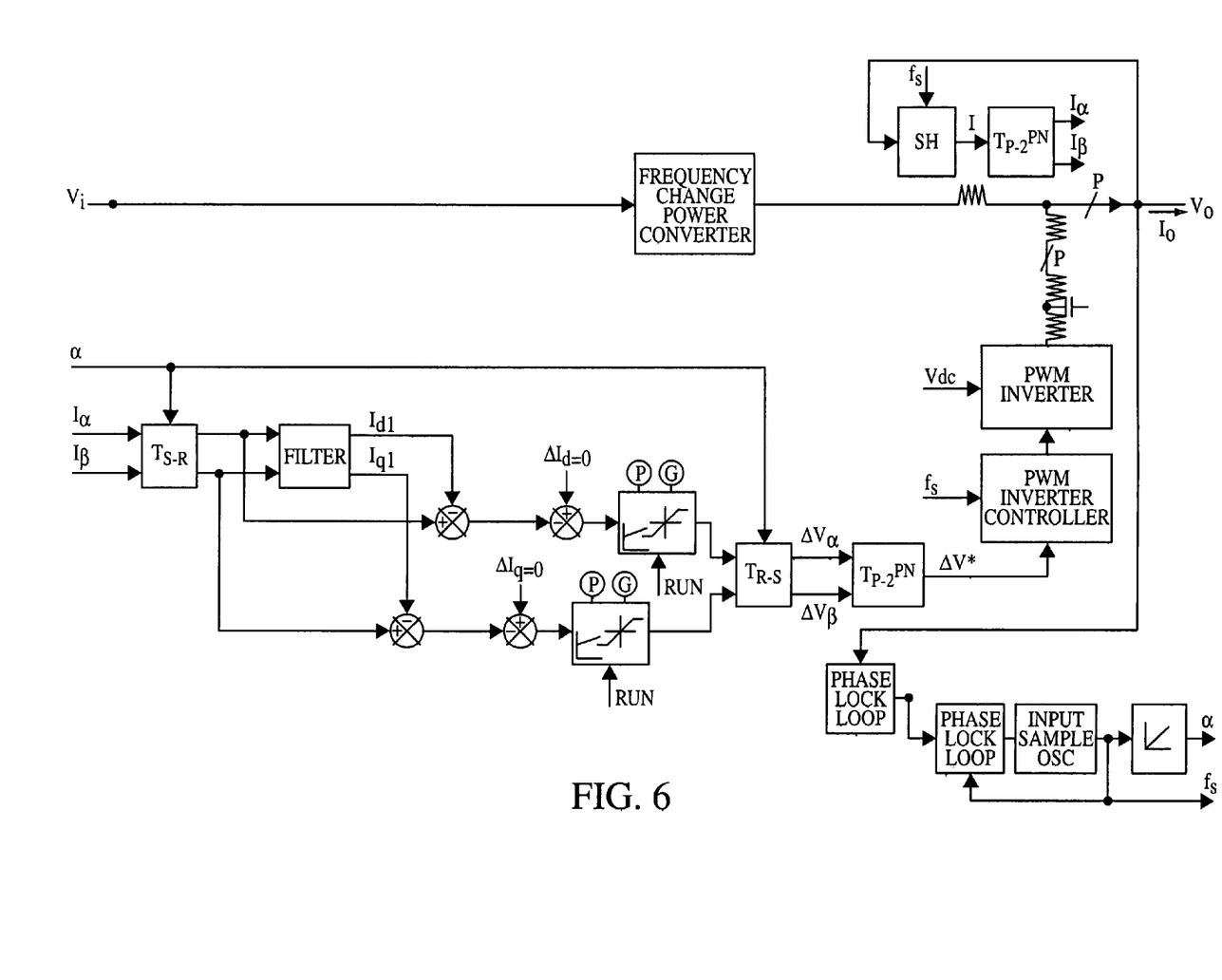
FIG. 6 is a block diagram of a PWM inverter current controller for wide band harmonic neutralization using shunt current injection.

As above, these harmonic signals are run through a pair of proportional integral (PI) controllers and are subsequently transformed back (via $T_{r-s}$ and $T^{PN}_{2-p}$) to return the signals to the multi-phase stationary reference format. After utilizing the PWM inverter controller and inverter as described above, a harmonic canceling voltage is injected in series with FIG. 6 depicts a block diagram of an exemplary PWM inverter current controller for wide band harmonic neutralization using shunt current injection. As in the comparison between the current-shunt (FIG. 3) and voltage-series (FIG. 4) in the narrow band case, the comparison between the current-shunt (FIG. 6) and series-voltage (FIG. 5) versions of the wide band inverter controller are alike in the same way. In short, calculations based on voltage are replaced with calculations based on current, and the actual injection takes place via current shunt, rather than via voltage in series. Otherwise, the operation of the wide band voltage-series inverter of FIG. 5 is identical to the current-shunt inverter of FIG. 6.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. An inverter controller subsystem for a harmonic neutralization frequency changer system; comprising:
    a frequency changer;
    a high bandwidth inverter;
    an inverter controller adapted to calculate harmonics at the frequency changer and control the high bandwidth inverter to generate harmonic cancellation signals, wherein said inverter controller samples the frequency changer signals in a stationary reference plane, converts the sampled signals into a rotating reference frame, generates harmonic neutralization signals, and then converts the harmonic neutralization signals back into the stationary reference plane; and
    an injection transformer for injecting said calculated harmonic neutralization signals into said frequency changer system.

2. The system of claim 1, wherein said inverter controller calculates harmonic neutralization signals based on a discrete narrow band calculation methodology.

3. The system of claim 2, wherein said harmonic neutralization signals are current signals.

4. The system of claim 2, wherein said harmonic neutralization signals are voltage signals.

5. The system of claim 2, wherein said narrow band calculations include n subcircuits, where n is calculated based upon the topology of the frequency changer.

6. The system of claim 2, further comprising a second injection transformer, wherein said inverter controller samples both input and output signals from the frequency changer and calculates and injects harmonic neutralization signals at the input and the output of the frequency changer.

7. The system of claim 1, wherein said inverter controller calculates harmonic neutralization signals based on a wide band calculation methodology.

8. The system of claim 7, wherein said harmonic neutralization signals are current signals.

9. The system of claim 7, wherein said harmonic neutralization signals are voltage signals.

10. The system of claim 7, wherein said inverter controller includes a filter to remove high frequency harmonics.

11. The system of claim 7, further comprising a second injection transformer, wherein said inverter controller samples both input and output signals from the frequency changer and calculates and injects harmonic neutralization signals at the input and the output of the frequency changer.

12. A power converter system, comprising:
- a direct conversion frequency changer including an input and an output, the frequency changer adapted to accept an input voltage at an input frequency at the input and deliver an output voltage at an output frequency at the output;
- an input high bandwidth inverter;
- an output high bandwidth inverter;
- an inverter controller adapted to calculate harmonics at the input and output of the frequency changer and control the input and output high bandwidth inverters to generate input and output harmonic cancellation signals, wherein said inverter controller samples the frequency changer signals in a stationary reference plane, converts the sampled signals into a rotating reference frame, generates harmonic neutralization signals, and then converts the harmonic neutralization signals back into the stationary reference plane;
- an input harmonic injection transformer connected to the input inverter and the input of the frequency changer to inject said input harmonic neutralization signals; and
- an output harmonic injection transformer connected to the output inverter and the output of the frequency changer to inject said output harmonic neutralization signals.

13. The system of claim 12, wherein said inverter controller calculates harmonic neutralization signals based on a discrete narrow band calculation methodology.

14. The system of claim 13, wherein said harmonic neutralization signals are current signals.

15. The system of claim 13, wherein said harmonic neutralization signals are voltage signals.

16. The system of claim 13, wherein said narrow band calculations include n subcircuits, where n is calculated based upon the topology of the frequency changer.

17. The system of claim 13, further comprising a second injection transformer, wherein said inverter controller samples both input and output signals from the frequency changer and calculates and injects harmonic neutralization signals at the input and the output of the frequency changer.

18. The system of claim 12, wherein said inverter controller calculates harmonic neutralization signals based on a wide band calculation methodology.

19. The system of claim 18, wherein said harmonic neutralization signals are current signals.

20. The system of claim 18, wherein said harmonic neutralization signals are voltage signals.

* * * * *